Patented Apr. 14, 1931

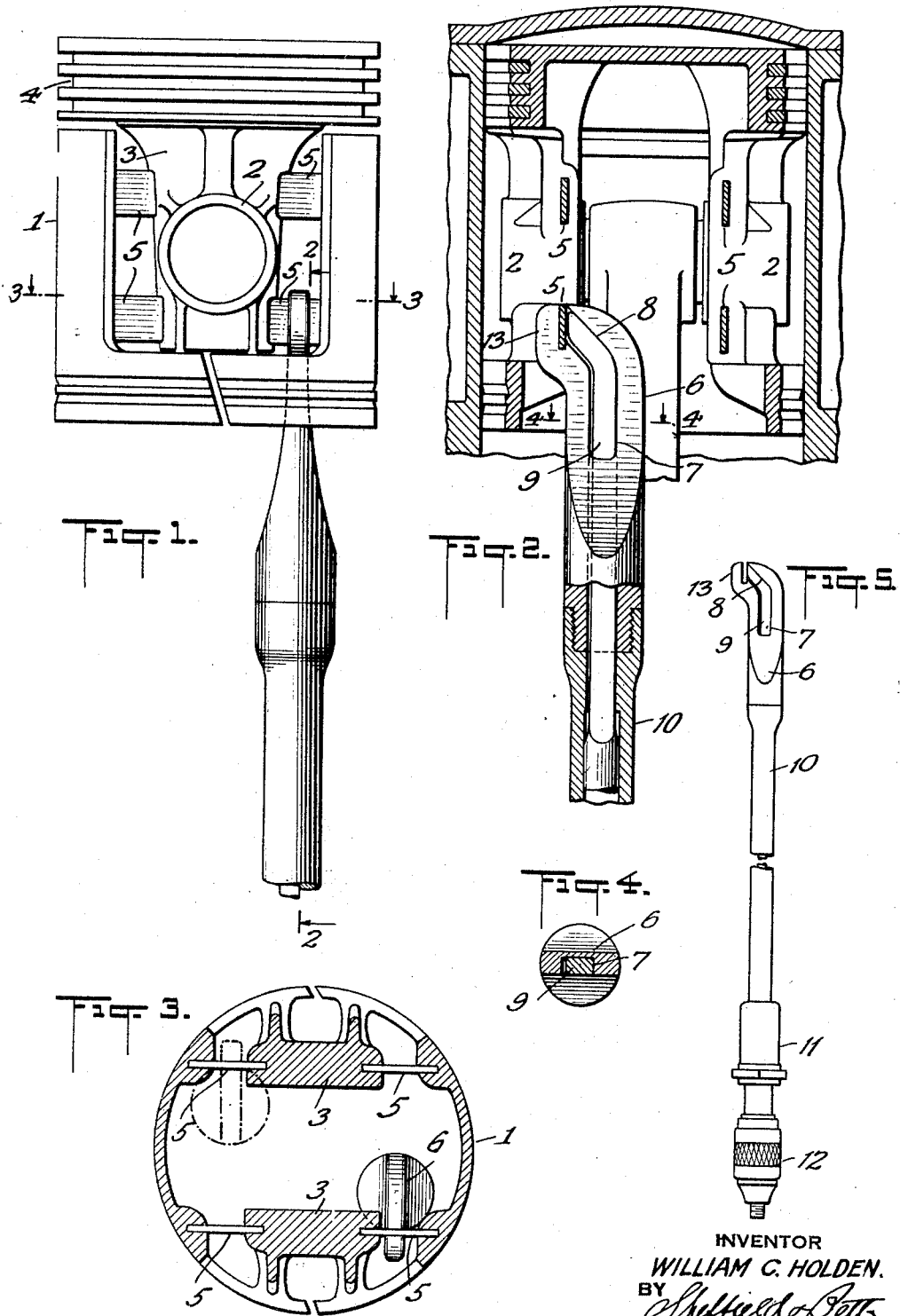

1,801,005

UNITED STATES PATENT OFFICE

WILLIAM C. HOLDEN, OF OSSINING, NEW YORK

PEENING TOOL

Application filed March 19, 1930. Serial No. 437,026.

This invention relates to tools whereby a hammer-like member is caused to strike a succession of rapid blows upon a member or part whose shape or dimensions it is desired to change by a so-called "peening" action.

This specification describes a tool or implement that is a modification of, and to a certain extent an improvement over the device described and claimed in my prior application Serial No. 411,289, filed December 3, 1929.

The object of the present invention is to provide a peening tool which is adapted for certain uses for which my prior devices cannot be used except by certain changes in construction in the operating head of the tool.

In my prior application is described one special use of the peening tool which I have claimed therein. Such use involves the enlargement or changing the diameter of pistons of automobile engines to prevent so-called "slapping", without removing such pistons from their respective cylinders.

The principal object of the peening tool of the present invention is also to produce a peening action but in connection with a different type of piston from that previously described.

Many automobiles of the present day have engines that are provided with pistons made of an aluminum alloy in which are cast certain transverse struts of a metal having a smaller coefficient of expansion than does the alloy. Such struts are usually of steel and extend between the wrist pin bearing or housing and the cylindrical walls of the piston to keep the bearing in the proper position. This construction has the advantage of reducing the expansion of the piston when heated by the action of the burning fuel. Pistons so made are subject to the wearing action of the cylinder walls so that there is a slight reduction in diameter that often results in the vibration or slapping of the piston on the cylinder walls, when the engine is running at normal speed. The reduction in the diameter of pistons can be accurately corrected if the struts above refered to can be slightly lengthened to correspondingly increase the diameter of the pistons, thereby taking up the objectionable looseness.

The special object, therefore, of the present invention is to provide a tool whereby the said transverse steel struts of alloy pistons may be transversely peened or hammered to lengthen the same without removing the pistons from the cylinders in which they are located.

For a detailed description of this invention, reference may be had to the following specification and to the accompanying drawings, forming a part thereof, in which Fig. 1 is a side elevation of a piston showing my improved tool applied to one of the struts thereof;

Fig. 2 is a vertical section of a piston as in Fig. 1, also showing a portion of the cylinder walls;

Fig. 3 is a horizontal section taken substantially on the line 3—3, Fig. 1;

Fig. 4 is a cross-section taken substantially on the line 4—4 of Fig. 2; and

Fig. 5 is a side elevation of my improved tool.

Referring to the drawings, the numeral 1 indicates the piston-walls which are usually cut away adjacent the wrist pin bearing tube as indicated. The wrist pin bearing is supported by a central member 3 which connects with the piston-head 4, which is provided with the usual grooves in which are located the packing rings. The main portion of the central member 3 is fixed in position and prevented from moving laterally within the piston by four steel struts 5, which are usually fixed in the metal of the piston when the same is cast. If the piston has become worn on its outer surface, by prolonged use so that it is reduced in diameter to such an extent that slapping is caused, the diameter thereof may be slightly increased by hammering or peening the struts in a transverse direction thereby causing the metal of the struts to be elongated transverse to the direction of the hammering to increase their lengths. This hammering operation is accomplished by my improved tool which is preferably constructed as follows:

The head 6 of the tool is substantially rectangular in shape as indicated in Figs. 4 and 5. The head 6 is provided with a groove 7, having an angular portion 8, at its outer end. Within the groove 7 and 8 is a correspondingly shaped preferably rectangular rod 9, which is somewhat smaller than the width of the groove so that its outer end may have a very slight reciprocating motion along the inclined portion 8 of the groove 7. The rod 9 extends into the tubular portion 10 of the tool, which latter forms a handle or body portion by which the tool may be held in position within the piston.

The rod 9 may be made round in cross-section where it passes through the tube 10 and preferably terminates adjacent the coupling 11 where it is acted upon by a pneumatic or other type of hammer contained within the casing 12, the details of which will be appreciated by those skilled in the art, without a detailed description.

The outer end portion of the head 6 of the tool is provided with a longitudinal projection or arm 13, which forms with the head 6 an effective anvil, which resists the lateral reaction of the strut being peened and causes the metal thereof to be compressed so that the strut is elongated. The space between the projection 13 and the hammer head 6 may be such as to adapt the tool to act upon a particular thickness of metal in the struts and may be varied to suit various dimensions of struts of different makes of pistons or other parts.

From the above description it will be seen that the action of the pneumatic hammer upon the rod 9 will cause the blows thereof to be transmitted to the outer end of the rod 9 and where the latter rests against or adjacent the metal of the strut 5 the metal of the latter will be displaced laterally and will thus increase the length of the strut.

It will be apparent that this form of the tool may be easily designed so that thin pieces of metal in other devices or parts may be peened or their shapes changed as may be required and in certain instances other than rectangular pieces of metal may be treated.

Having thus described one form of my invention, what I claim and desire to protect by Letters Patent is:

1. A peening tool comprising an elongated supporting member, a longitudinal vibratory member carried thereby having a laterally extending head, means adapted to cause it to impinge in a lateral direction upon the article being treated, an anvil carried adjacent the end of said supporting member, and means for vibrating said longitudinal member and head to cause lateral movement of said head.

2. A peening tool comprising an elongated supporting member, having a longitudinal recess therein whose outer end is inclined laterally, a longitudinal vibratory member carried in said recess and having a laterally extending head adapted to impinge laterally upon the article being treated, said head being guided laterally by the inclined portion of said recess, an anvil carried by said supporting member opposite said head, and means for vibrating said longitudinal member and head in said recess.

3. A peening tool comprising an elongated supporting member having a tubular extension and a recess in said member whose outer end is inclined laterally, a longitudinal vibratory member carried loosely in said recess and tubular extension and having a laterally extending head adapted to impinge laterally upon the article being treated, said head being guided laterally by the inclined portion of said recess, an anvil carried by said supporting member opposite said head, and means for vibrating said longitudinal member and said head in said recess.

Signed this 18th day of March, 1930.

WILLIAM C. HOLDEN.